(12) United States Patent
Mori

(10) Patent No.: US 10,073,289 B2
(45) Date of Patent: Sep. 11, 2018

(54) LIQUID CRYSTAL DISPLAY DEVICE AND VEHICLE MEASURING INSTRUMENT

(71) Applicant: YAZAKI CORPORATION, Tokyo (JP)

(72) Inventor: Kouji Mori, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 142 days.

(21) Appl. No.: 14/714,921

(22) Filed: May 18, 2015

(65) Prior Publication Data

US 2015/0331277 A1    Nov. 19, 2015

(30) Foreign Application Priority Data

May 19, 2014    (JP) ................................. 2014-103054

(51) Int. Cl.
*G02F 1/1335*    (2006.01)
*F21V 8/00*    (2006.01)
(Continued)

(52) U.S. Cl.
CPC ........ *G02F 1/133504* (2013.01); *B60K 37/02* (2013.01); *B60Q 3/12* (2017.02);
(Continued)

(58) Field of Classification Search
CPC .............. G02F 1/133606; B60K 37/02; B60K 2350/1064
See application file for complete search history.

(56) References Cited

U.S. PATENT DOCUMENTS 5,377,083 A    12/1994 Tada
2006/0067168 A1    3/2006 Winkler et al.
(Continued)

FOREIGN PATENT DOCUMENTS

CN    1755556 A    4/2006
DE    43 34 411 A1    4/1994
(Continued)

OTHER PUBLICATIONS

Communication dated Sep. 1, 2017 from the State Intellectual Property Office of the P.R.C., in counterpart Chinese application No. 201510254227.3.
(Continued)

*Primary Examiner* — Wen-Ying P Chen
(74) *Attorney, Agent, or Firm* — Sughrue Mion, PLLC

(57) ABSTRACT

A liquid crystal display device includes a liquid crystal panel; a light source; a light guide member that guides light emitted from the light source to a back surface side of the liquid crystal panel; a diffuser panel that is disposed between the light guide member and the liquid crystal panel, extended over an entire area of the back surface of the liquid crystal panel, and diffuses the light received from the light guide member to illuminate the light to the liquid crystal panel; a first reflector that is provided on a back surface of the diffuser panel close to the light guide member side and on an optical axis of the light received from the light guide member, and reflects the light towards the light guide member side; and a second reflector that reflect the light reflected on the first reflector to the diffuser panel side.

9 Claims, 6 Drawing Sheets

(51) Int. Cl.
*G02F 1/1339* (2006.01)
*B60K 37/02* (2006.01)
*B60Q 3/12* (2017.01)
*G02B 27/01* (2006.01)

(52) U.S. Cl.
CPC ......... *G02B 6/0051* (2013.01); *G02B 6/0055* (2013.01); *G02F 1/13394* (2013.01); *G02F 1/133524* (2013.01); *G02F 1/133553* (2013.01); *B60K 2350/1064* (2013.01); *B60K 2350/203* (2013.01); *B60K 2350/941* (2013.01); *G02B 27/01* (2013.01); *G02B 27/0101* (2013.01); *G02F 1/133606* (2013.01)

(56) References Cited

U.S. PATENT DOCUMENTS

| | | | |
|---|---|---|---|
| 2006/0158320 A1* | 7/2006 | Shibata | B60K 37/02 340/425.5 |
| 2009/0196013 A1* | 8/2009 | Mezouari | B60K 35/00 362/23.2 |
| 2013/0176118 A1* | 7/2013 | Nagara | B60K 37/02 340/425.5 |
| 2014/0240953 A1 | 8/2014 | Mori | |

FOREIGN PATENT DOCUMENTS

| | | |
|---|---|---|
| JP | 2006-118892 A | 5/2006 |
| JP | 2008-26854 A | 2/2008 |
| JP | 2010-266409 A | 11/2010 |
| JP | 2011-186281 A | 9/2011 |
| JP | 2013-88351 A | 5/2013 |
| JP | 2013-101049 A | 5/2013 |
| JP | 2013-195247 A | 9/2013 |

OTHER PUBLICATIONS

Communication dated Mar. 6, 2018 from the Japanese Patent Office in counterpart Application No. 2014-103054.
Communication dated Jun. 30, 2018 from the German Patent and Trademark Office in counterpart application No. 10 2015 209 015.9.

* cited by examiner

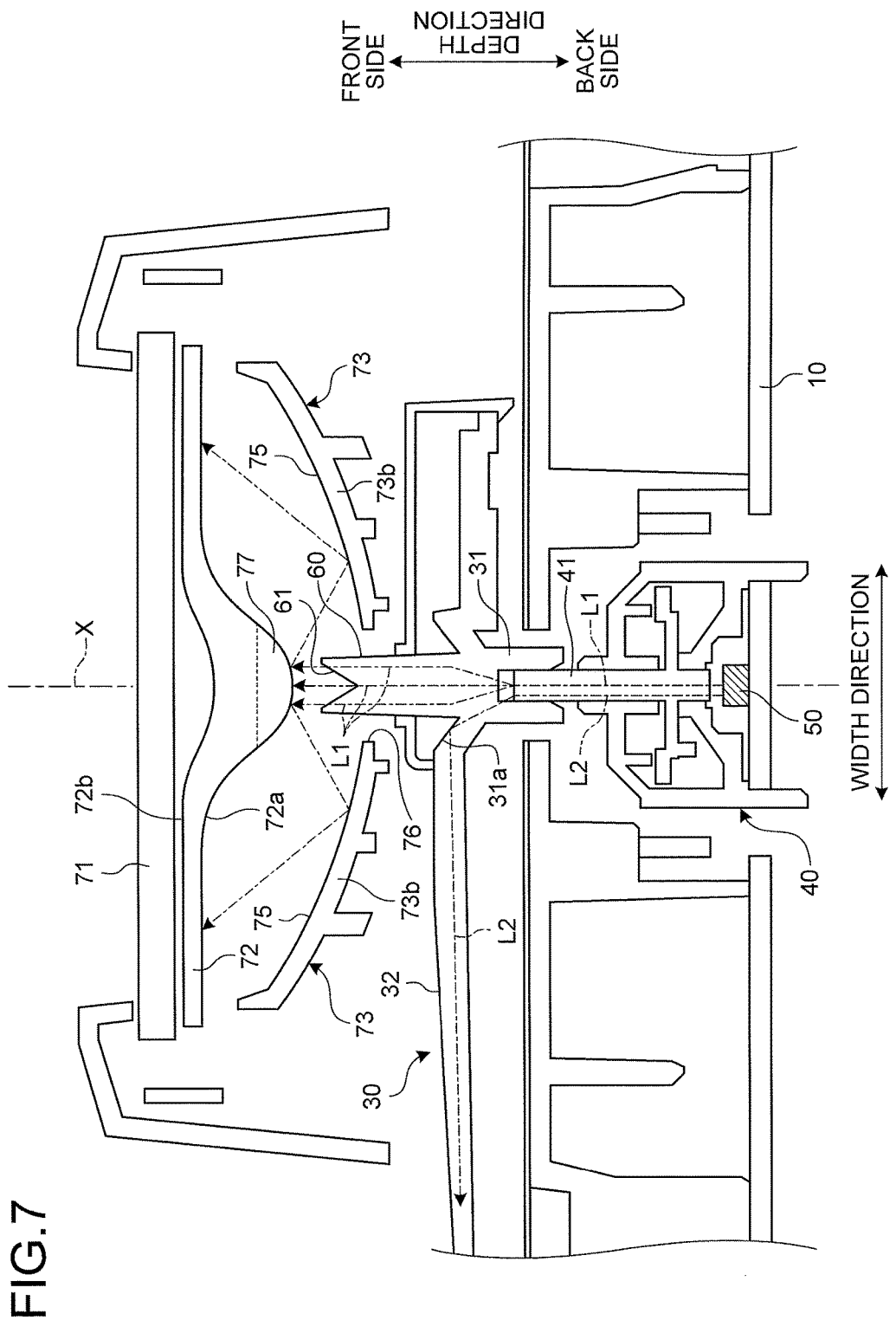

LIQUID CRYSTAL DISPLAY DEVICE AND VEHICLE MEASURING INSTRUMENT

CROSS-REFERENCE TO RELATED APPLICATION(S)

The present application claims priority to and incorporates by reference the entire contents of Japanese Patent Application No. 2014-103054 filed in Japan on May 19, 2014.

BACKGROUND OF THE INVENTION

1. Field of the Invention

The present invention relates to a liquid crystal display device and a vehicle measuring instrument.

2. Description of the Related Art

A structure for a liquid crystal display device mounted on a vehicle measuring instrument is known in which the liquid crystal display device uses a light source for the vehicle measuring instrument as its light source without adding a dedicated one. As an example of the structure described above, Japanese Patent Application Laid-open No. 2013-101049 discloses a vehicle measuring instrument that includes a liquid crystal display panel (liquid crystal display device) disposed in front of a shaft connecting portion of a indicating needle main body fixed on an end of a indicating needle drive shaft that guides illuminating light from a indicating needle illuminating light source. This vehicle measuring instrument includes an illuminating light dividing and outputting portion that is provided on the front end of the shaft connecting portion and outputs a part of the illuminating light received from the indicating needle drive shaft to the liquid crystal display panel, and a luminance adjusting portion that distributes the illuminating light output from the illuminating light dividing and outputting portion to the entire area of the back surface of the liquid crystal display panel. With this configuration, the vehicle measuring instrument can adjust luminance of the liquid crystal display panel by using a part of the illuminating light emitted from the indicating needle illuminating light source.

However, in some cases, the vehicle measuring instrument disclosed in Japanese Patent Application Laid-open No. 2013-101049 fails to uniformly illuminate the liquid crystal display device to which illuminating light is distributed from the indicating needle illuminating light source. Thus, there is much room for improvement with respect to uniformity of luminance of the liquid crystal display device.

SUMMARY OF THE INVENTION

The present invention is made in view of the problem described above, and it is an object of the present invention to provide a liquid crystal display device and a vehicle measuring instrument that can improve uniformity of luminance.

According to one aspect of the present invention, a liquid crystal display device includes a liquid crystal panel; a light source; a light guide member configured to guide light emitted from the light source to a back surface side of the liquid crystal panel; a diffuser panel configured to be disposed between the light guide member and the liquid crystal panel, extend over an entire area of the back surface of the liquid crystal panel, and diffuse the light received from the light guide member to illuminate the light to the liquid crystal panel; a first reflector configured to be provided on a back surface of the diffuser panel close to the light guide member side and on an optical axis of the light received from the light guide member, and reflect the light towards the light guide member side; and a second reflector configured to reflect the light reflected on the first reflector to the diffuser panel side.

According to another aspect of the present invention, in the liquid crystal display device, it is preferable to further include a spacer configured to be provided on a periphery of a surface of the diffuser panel close to the liquid crystal panel side, and maintain a certain distance between the diffuser panel and the liquid crystal panel.

According to still another aspect of the present invention, in the liquid crystal display device, it is preferable that the diffuser panel and the first reflector are integrally formed.

According to still another aspect of the present invention, in the liquid crystal display device, it is preferable that the light guide member is configured to output the light from the light source to a center portion of the back surface of the liquid crystal panel in a direction in which the optical axis orthogonally crosses the back surface, the back surface of the diffuser panel is formed in a convex shape curving and protruding towards the light guide member side with a point at which the optical axis of the light received from the light guide member crosses the back surface of the diffuser panel being a peak portion, the first reflector is provided on the peak portion of the convex shape, and the second reflector faces the back surface of the diffuser panel and is formed in a concave shape curving relative to the diffuser panel.

According to still another aspect of the present invention, a vehicle measuring instrument includes the liquid crystal display device; a dial plate configured to include a indicating needle drive shaft inserting hole, and arrange thereon a scale and characters corresponding to a measured quantity in a substantial circular-arc shape with the indicating needle drive shaft inserting hole being a center; an indicating needle driving unit configured to include an indicating needle drive shaft composed of a light guide material formed in a shape of a shaft and inserted into the dial plate from a back surface side to a front surface side of the dial plate through the indicating needle drive shaft inserting hole, and rotationally drive the indicating needle drive shaft by being disposed at the back surface side of the dial plate; an indicating needle member composed of a light guide material and configured to include a shaft connecting portion fixed on a leading end of the front surface side of the indicating needle drive shaft, and an indicating needle extending in a radial direction of the dial plate from the shaft connecting portion to indicate the scale; and an indicating needle illuminating light source configured to be disposed opposite to a leading end of the back surface side of the indicating needle drive shaft, and illuminate the indicating needle member by introducing illuminating light to the indicating needle drive shaft, wherein the liquid crystal display device is disposed at the front surface side of the dial plate so as to cover the shaft connecting portion, the light source for the liquid crystal display device is the indicating needle illuminating light source, and the light guide member of the liquid crystal display device is provided to protrude from the shaft connecting portion towards the liquid crystal display device side and is configured to output a part of the illuminating light received from the indicating needle drive shaft to the liquid crystal display device side.

The above and other objects, features, advantages and technical and industrial significance of this invention will be better understood by reading the following detailed descrip-

BRIEF DESCRIPTION OF THE DRAWINGS

FIG. 7 is an enlarged view of the main portion in FIG. 2 illustrating an outline of light guiding process of illuminating light emitted from a light source in the vehicle measuring instrument and the liquid crystal display device according to the embodiment.

DETAILED DESCRIPTION OF THE PREFERRED EMBODIMENT

The following describes an embodiment of a liquid crystal display device and a vehicle measuring instrument according to the present invention with reference to the accompanying drawings. In the accompanying drawings, the same reference signs are given to the same or corresponding portions, and the description thereof is not repeated.

Embodiment

Figure 1:
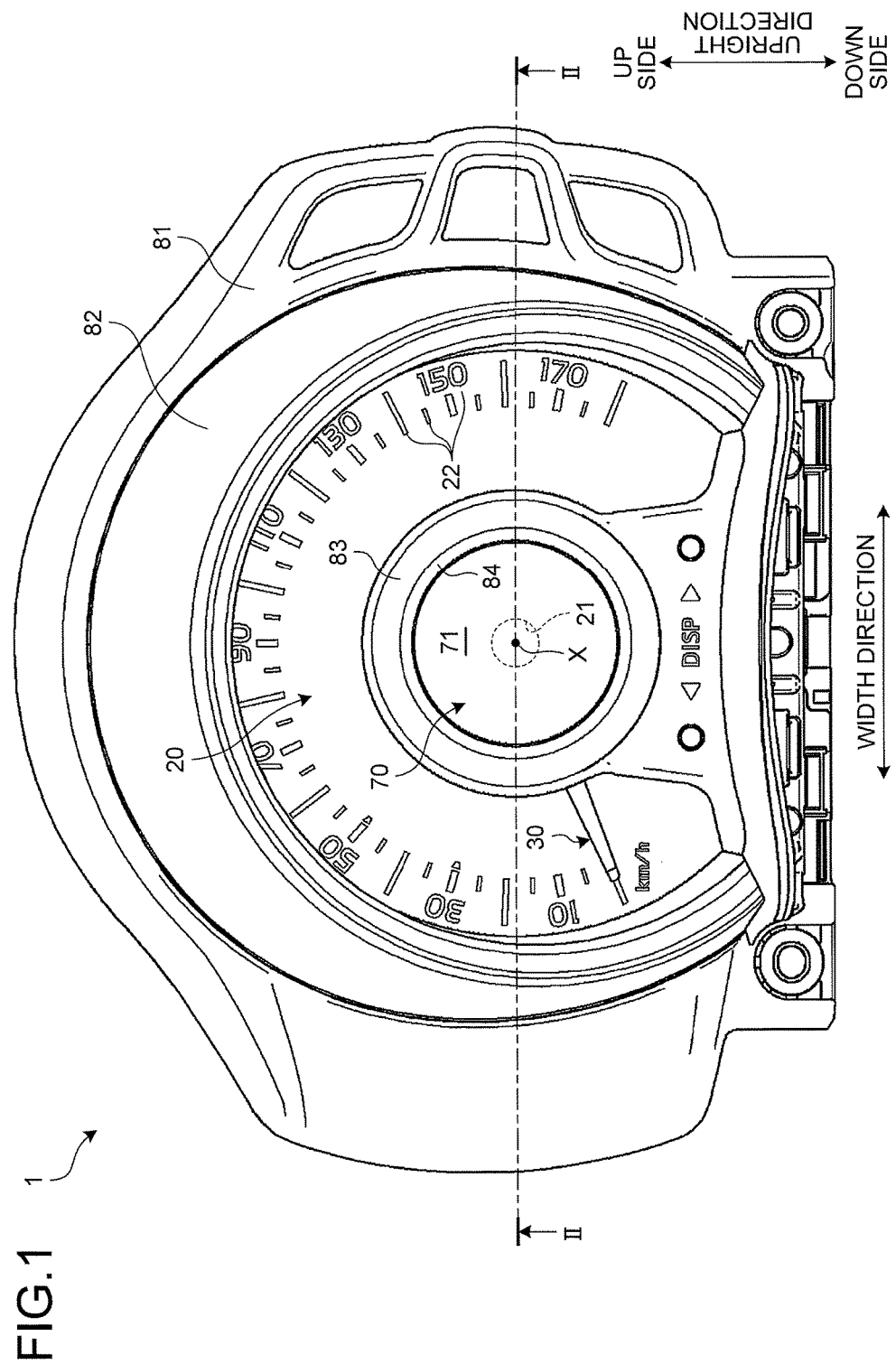
FIG. 1 is a front view of a vehicle measuring instrument on which a liquid crystal display device according to an embodiment of the present invention is mounted.
Figure 2:
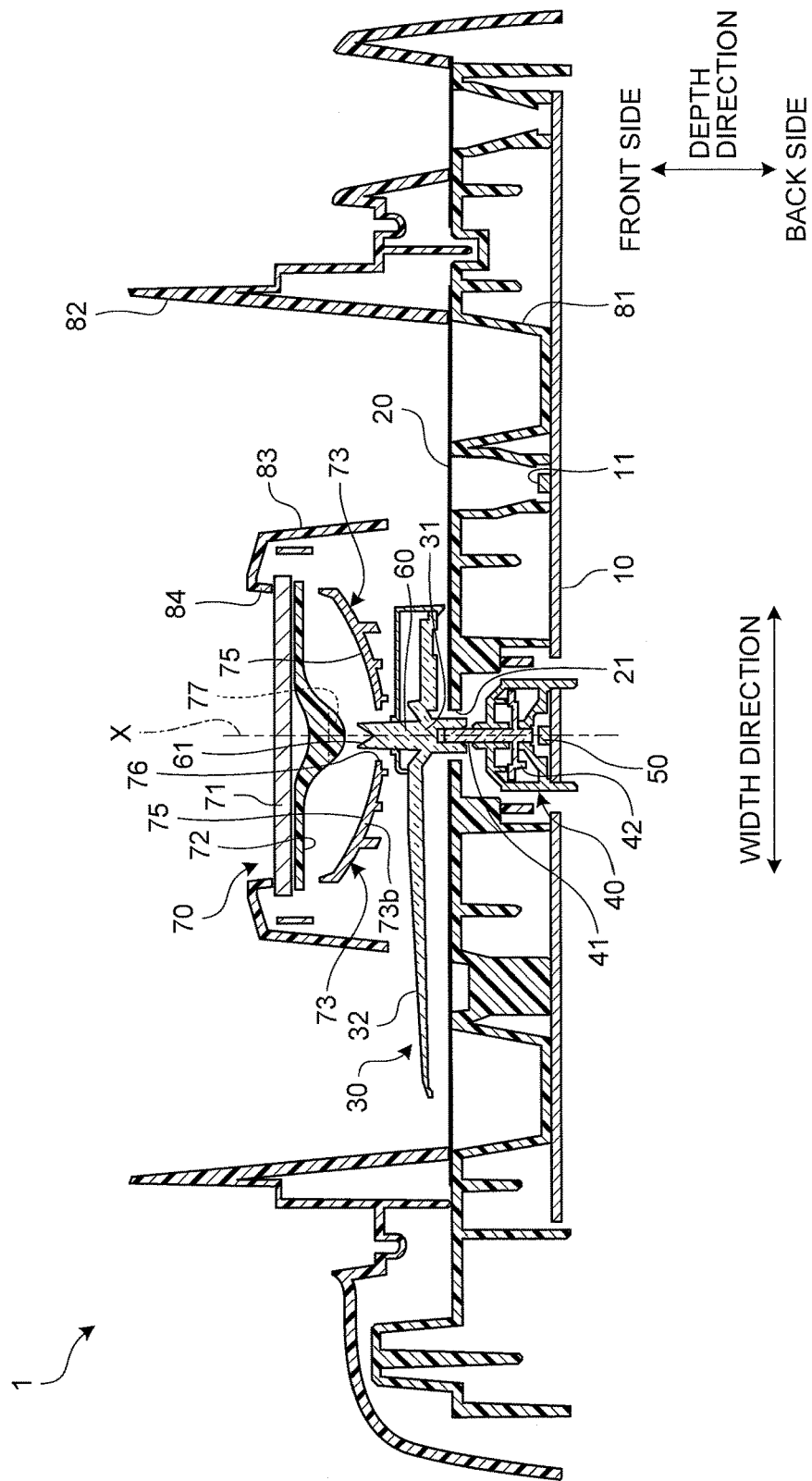
FIG. 2 is a cross-sectional view taken from line II-II in FIG. 1.
Figure 3:
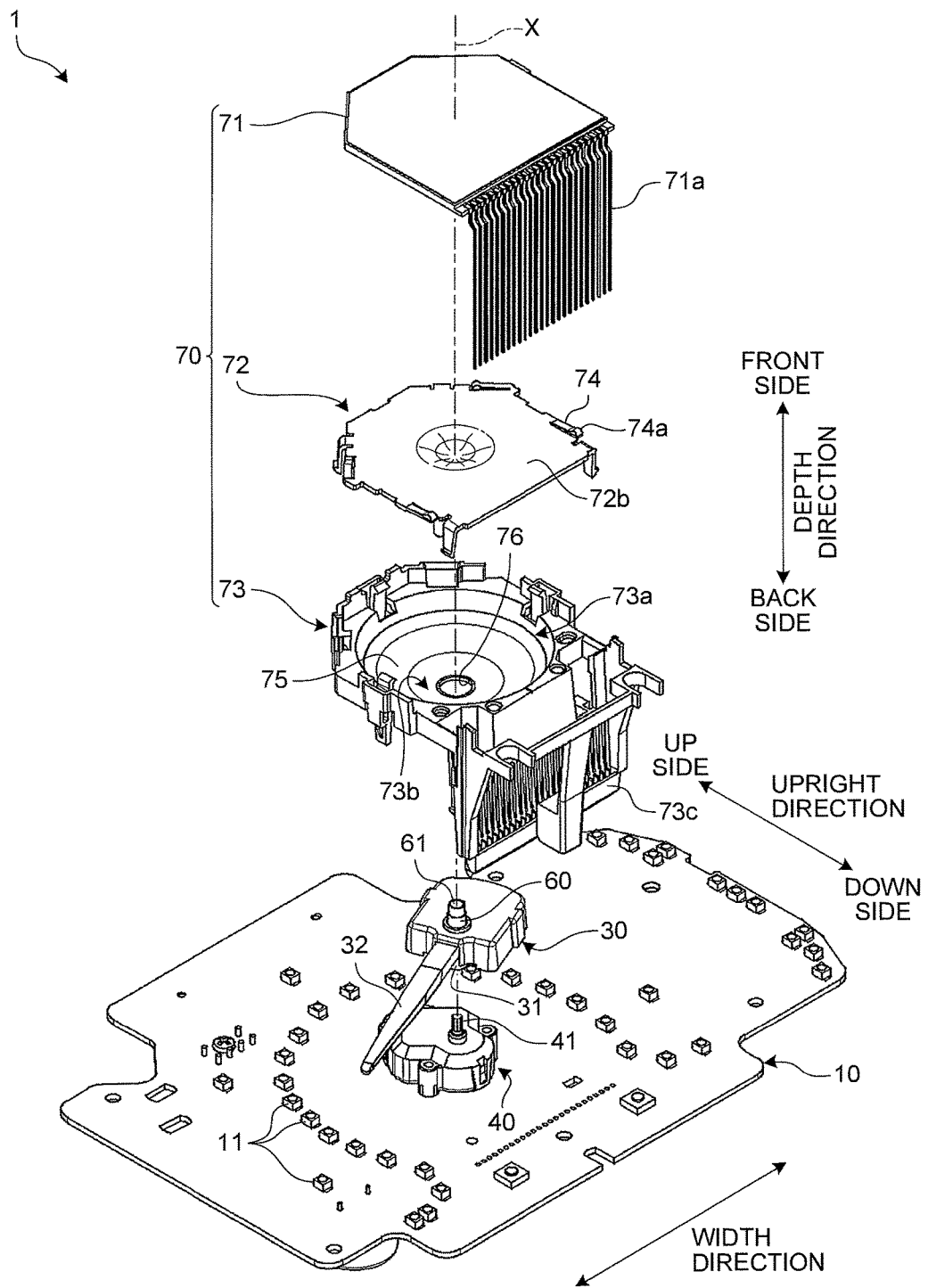
FIG. 3 is an exploded perspective view of a main portion of the vehicle measuring instrument illustrated in FIG. 1.
Figure 4:
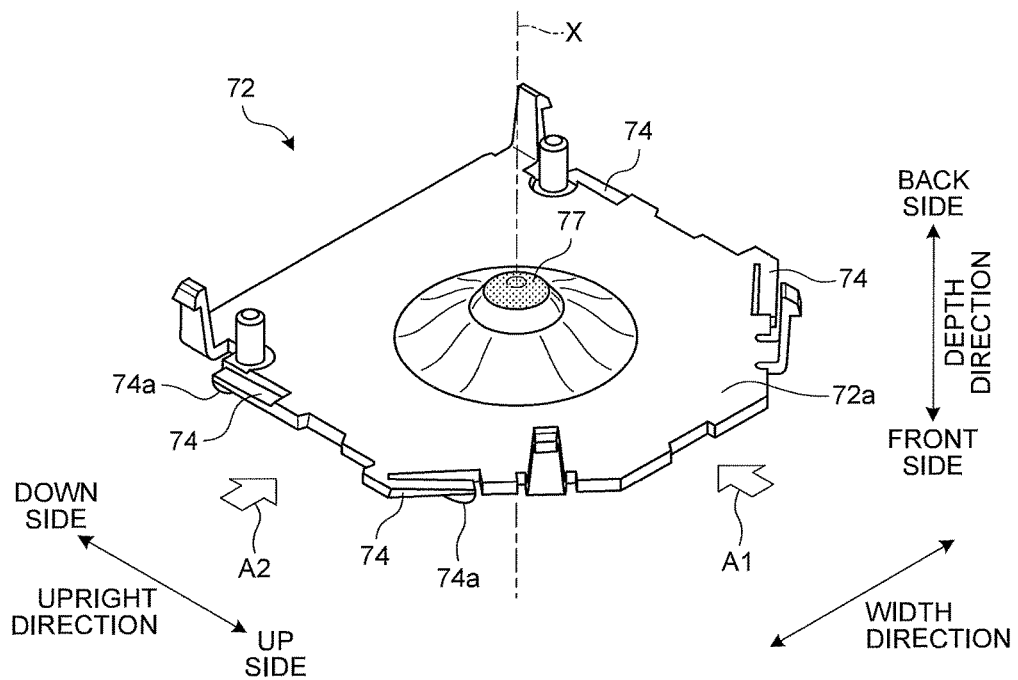
FIG. 4 is a perspective view illustrating a schematic configuration of a diffuser panel illustrated in FIG. 3.
Figure 5:
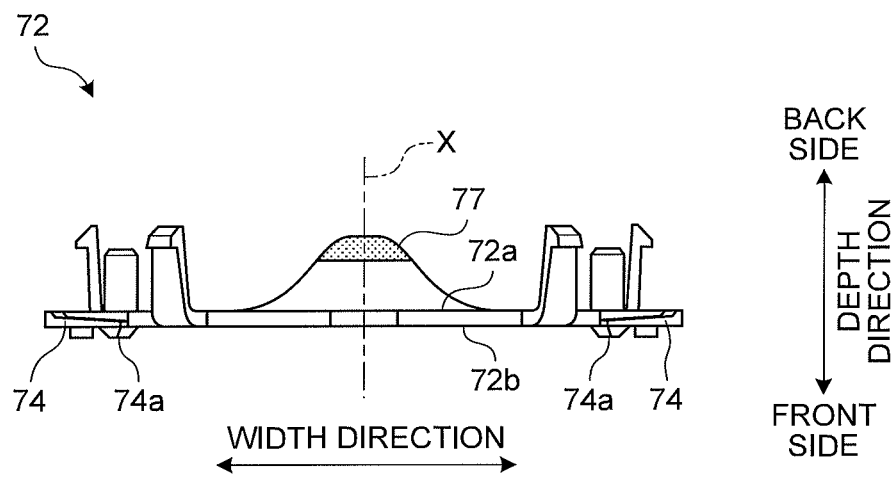
FIG. 5 is a diagram viewed from an arrow A1 in FIG. 4.
Figure 6:
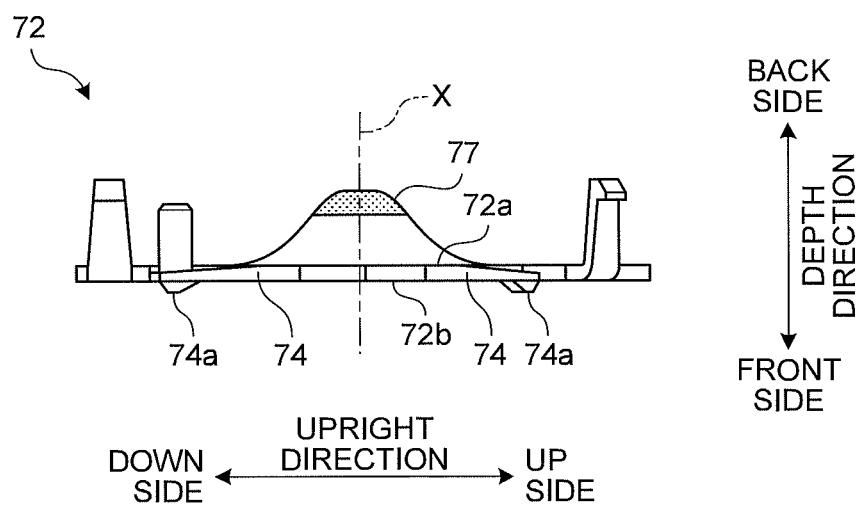
FIG. 6 is a diagram viewed from an arrow A2 in FIG. 4.

With reference to FIGS. 1 to 6, a configuration of a vehicle measuring instrument 1 is described on which a liquid crystal display device 70 according to an embodiment of the present invention is mounted. FIG. 1 is a front view of the vehicle measuring instrument on which the liquid crystal display device according to the embodiment of the present invention is mounted. FIG. 2 is a cross-sectional view taken from line II-II in FIG. 1. FIG. 3 is an exploded perspective view of a main portion of the vehicle measuring instrument illustrated in FIG. 1. FIG. 4 is a perspective view illustrating a schematic configuration of a diffuser panel illustrated in FIG. 3. FIG. 5 is a diagram viewed from an arrow A1 in FIG. 4. FIG. 6 is a diagram viewed from an arrow A2 in FIG. 4.

The vehicle measuring instrument 1 illustrated in FIG. 1 is a combination meter installed in a vehicle and including measuring functions, such as an accelerometer, a tachometer, and a fuel gauge. The vehicle measuring instrument 1 is installed in a vehicle such that the driver of the vehicle can see a display region of the vehicle measuring instrument 1 when seated on the driver's seat. The vehicle measuring instrument 1 is installed on, for example, an instrument panel disposed in front of the driver's seat of the vehicle.

The "width direction" of the vehicle measuring instrument 1 illustrated in FIG. 1 typically corresponds to the width direction of a vehicle to which the vehicle measuring instrument 1 is installed. The "upright direction" of the vehicle measuring instrument 1 illustrated in FIG. 1 typically corresponds to the vertical direction of the vehicle to which the vehicle measuring instrument 1 is installed, but the embodiment is not limited to this. In other words, the upward direction and the downward direction in the upright direction are not necessarily the same as those in the vertical direction. The "depth direction" of the vehicle measuring instrument 1 illustrated in FIG. 2 typically corresponds to the front-back direction of the vehicle to which the vehicle measuring instrument 1 is installed. The front side of the vehicle measuring instrument 1 in the depth direction faces the driver's seat of the vehicle, and typically is seen by the driver sitting on the driver's seat. The back side of the vehicle measuring instrument 1 in the depth direction is the opposite side of the front side, and typically is accommodated in the instrument panel.

As illustrated in FIGS. 1 to 3, the vehicle measuring instrument 1 includes a circuit board 10, a dial plate 20, a indicating needle member 30, a indicating needle driving unit (internal device) 40, a indicating needle illuminating light source 50 (light source), an illuminating light dividing and outputting portion 60 (light guide member), and a liquid crystal display device 70.

The circuit board 10 controls operations of the components in the vehicle measuring instrument 1. As illustrated in FIGS. 2 and 3, various components of the vehicle measuring instrument 1 are electrically connected to the circuit board 10, such as the indicating needle driving unit 40, the indicating needle illuminating light source 50, and the liquid crystal display device 70 described above, and dial plate illuminating light sources 11 for illuminating various signs on the dial plate 20. The operations of these components are controlled by the circuit board 10. As illustrated in FIG. 2, the circuit board 10 is accommodated inside a instrument case 81 (in FIG. 2, the back side of the instrument case 81 in the depth direction is partially omitted from illustration).

The dial plate 20 has a indicating needle drive shaft inserting hole 21 as illustrated in FIG. 2. On the front surface of the dial plate 20, as illustrated in FIG. 1, a scale and characters 22, which may be simply referred to as a "scale 22" in the following description, corresponding to a measured quantity (velocity) are arranged in a substantial circular-arc shape with the indicating needle drive shaft inserting hole 21 being the center. The dial plate 20 is mounted on the front surface of the instrument case 81 as illustrated in FIG. 2. The indicating needle drive shaft inserting hole 21 described above is also formed in the front surface of the instrument case 81, and penetrates the dial plate 20 and the instrument case 81 from an inner side of the instrument case 81 (the back side of the dial plate 20) to the front side of the dial plate 20.

Provided on the front surface of the instrument case 81 is an eaves shaped facing 82 extending towards the front side of the vehicle measuring instrument 1. The facing 82 covers the periphery of the dial plate 20 so that the dial plate 20 will not be irradiated with outside light that lowers the visibility of the dial plate 20. An opening of the facing 82 at the front side thereof is covered with a transparent surface glass (not illustrated).

The indicating needle driving unit 40 includes a indicating needle drive shaft 41 formed in a shape of a shaft and inserted into the indicating needle drive shaft inserting hole 21. The indicating needle member 30 is fixed on the leading end of the indicating needle drive shaft 41 as illustrated in FIG. 2. The indicating needle drive shaft 41 and the indicating needle member 30 are composed of a light guide (translucent) material.

The indicating needle member 30 includes a shaft connecting portion 31 that is the base end of the indicating needle member 30 fixed on the leading end of the indicating needle drive shaft 41, and a indicating needle 32 that extends in the radial direction of the dial plate 20 from the shaft connecting portion 31 to indicate the scale 22.

As illustrated in FIG. 2, the indicating needle driving unit 40 is disposed at the back side of the dial plate 20. As illustrated in FIGS. 2 and 3, the indicating needle driving unit 40 is mounted on the circuit board 10 fixed on the instrument case 81 at the back side of the dial plate 20 and the indicating needle drive shaft 41. The indicating needle driving unit 40 includes the indicating needle drive shaft 41 formed in a shape of a shaft and inserted into the indicating needle drive shaft inserting hole 21, a gear 42 integrally formed with the indicating needle drive shaft 41, and a rotation controller (not illustrated) that rotates a gear (not illustrated) engaged with the gear 42 the number of times corresponding to a measured value. The indicating needle driving unit 40 rotationally drives the indicating needle drive shaft 41 in accordance with a measured value so that the indicating needle member 30 indicates a division of the scale 22 corresponding to the measured value.

As illustrated in FIG. 2, the indicating needle illuminating light source 50 is disposed on the circuit board 10 inside the instrument case 81 such that the indicating needle illuminating light source 50 faces the back end surface of the indicating needle drive shaft 41. In other words, the indicating needle illuminating light source 50 is disposed on an axis line X of the indicating needle drive shaft 41 and the indicating needle drive shaft inserting hole 21 and is configured to emit light in the direction of the axis line X.

As illustrated in FIGS. 2 and 3, the illuminating light dividing and outputting portion 60 is a light guide shaft that is provided on the front end of the shaft connecting portion 31 and that protrudes towards the liquid crystal display device 70 side. The illuminating light dividing and outputting portion 60 is integrally formed with the shaft connecting portion 31. The illuminating light dividing and outputting portion 60 outputs a part of illuminating light received from the indicating needle drive shaft 41 to the liquid crystal display device 70. As illustrated in FIG. 2, the illuminating light dividing and outputting portion 60 is formed in a shape of a shaft with the axis line X being the axial direction thereof, and a front portion of the illuminating light dividing and outputting portion 60 is inserted into the liquid crystal display device 70 from the back side thereof. A front end surface 61 of the illuminating light dividing and outputting portion 60 inserted into the liquid crystal display device 70 is formed in a shape of a concave lens as illustrated in FIG. 2.

The liquid crystal display device 70 displays various kinds of information except information such as velocity that is displayed on the dial plate 20 of the vehicle measuring instrument 1. In the present embodiment, as illustrated in FIGS. 1 and 2, the liquid crystal display device 70 is disposed in front of the dial plate 20 and overlaps a center portion of the dial plate 20, and is disposed such that the driver can see the scale and characters 22 on the dial plate 20. More specifically, as illustrated in FIG. 2, the liquid crystal display device 70 is disposed in front of the front end of the shaft connecting portion 31, disposed substantially in the center of the dial plate 20, with a certain distance left therebetween so that the liquid crystal display device 70 covers the front side of the shaft connecting portion 31. As illustrated in FIG. 1, the periphery of the liquid crystal display device 70 is accommodated in a panel accommodating case 83. The panel accommodating case 83 includes a bezel 84 that rims the periphery of the liquid crystal display device 70 to improve the appearance.

As illustrated in FIGS. 2 and 3, the liquid crystal display device 70 includes a liquid crystal panel 71, a diffuser panel 72, and a liquid crystal display (LCD) case 73.

The liquid crystal panel 71 is a plate-like component configured by a liquid crystal layer being sandwiched by transparent substrates. The liquid crystal panel 71 is electrically connected to the circuit board 10 via terminals 71a. The liquid crystal panel 71 functions as a display screen of the liquid crystal display device 70 for presenting various kinds of information to the driver, and is disposed in front of any other components of the liquid crystal display device 70 in the depth direction.

The diffuser panel 72 diffuses incident light and illuminates diffused light. The diffuser panel 72 is a plate-like component disposed at the back side of the liquid crystal panel 71 and facing the liquid crystal panel 71, and extends over the entire area of the back surface of the liquid crystal panel 71. The diffuser panel 72 diffuses light that enters from the back surface of the diffuser panel 72 over the entire area of a main surface 72b, whereby light having uniform luminance is illuminated to the liquid crystal panel 71 in front of the diffuser panel 72. The diffuser panel 72 can be made, for example, by adding minute particles called a light dispersing agent to a transparent resin formed in matrix so that the resin can diffuse light.

The LCD case 73 has an opening 73a at the front side thereof, and holds the liquid crystal panel 71 and the diffuser panel 72 that are accommodated into the LCD case 73 from the opening 73a. The terminals 71a of the liquid crystal panel 71 are connected to the circuit board 10 via connectors 73c of the LCD case 73. The LCD case 73 has a bottom wall 73b at the back side thereof. Formed on the inner surface of the bottom wall 73b is a curved surface 75 (second reflector) having a concave shape with the cross point with the axis line X being most recessed to the back side of the LCD case 73. The curved surface 75 is formed in a circular shape with the axis line X being the center when seen from the front side of the LCD case 73 in the depth direction. A through hole 76 is formed on the cross point with the axis line X on the bottom wall 73b, that is, on the deepest portion of the curved surface 75 when seen from the front side of the LCD case 73 in the depth direction. A portion of the front end surface 61 of the illuminating light dividing and outputting portion 60 can be inserted through the through hole 76 from the back side to the inner side of the bottom wall 73b.

The periphery of the main surface 72b of the diffuser panel 72 close to the liquid crystal panel 71 includes a plurality of plate springs 74. Provided on an end of each plate spring 74 is a contact portion 74a that protrudes to the front of the diffuser panel 72. In a state in which the liquid crystal panel 71 and the diffuser panel 72 are accommodated in the LCD case 73, the plate springs 74 contact the back surface of the liquid crystal panel 71 via the contact portion 74a. With this configuration, the liquid crystal panel 71 and the diffuser panel 72 are held with certain space left therebetween, and an air layer is formed between the liquid crystal panel 71 and the diffuser panel 72, thereby improving the diffusibility of light. In other words, the plate springs 74 function as a spacer to maintain a certain distance between the diffuser panel 72 and the liquid crystal panel 71. The plate springs 74 can elastically deform along the depth direction to reduce vibrations transmitted from the vehicle to the liquid crystal panel 71.

In the present embodiment, the indicating needle illuminating light source 50 functions as a light source for the liquid crystal display device 70. The illuminating light dividing and outputting portion 60 is disposed such that a portion thereof is inserted into the liquid crystal display device 70 from the through hole 76 of the LCD case 73, and the illuminating light dividing and outputting portion 60 functions as a light guide member that guides light emitted from the indicating needle illuminating light source 50 to the back surface of the liquid crystal panel 71. As illustrated in FIGS. 2 and 3, the liquid crystal panel 71 and the diffuser panel 72 are disposed perpendicular to the optical axis (axis line X) of the light received from the illuminating light dividing and outputting portion 60 and are disposed such that the cross point with the axis line X is the substantial center (or the center of gravity) thereof. In other words, the illuminating light dividing and outputting portion 60 is configured to illuminate light received from the indicating needle illuminating light source 50 to the center of the back surface of the liquid crystal panel 71 in the direction of the optical axis (axis line X) perpendicular to the back surface.

The illuminating light dividing and outputting portion 60 that guides light received from the indicating needle illuminating light source 50 to the liquid crystal display device 70 is formed in a shape of a shaft with the axis line X being the axis direction of the illuminating light dividing and outputting portion 60. Thus, the luminance of light output to the diffuser panel 72 is considered to be largest at the cross point with the axis line X. In order to preferably diffuse illuminating light from the axis line X to obtain uniform luminance, the diffuser panel 72 is thickest in the depth direction at a portion on the axis line X to which light is output, and becomes less thick towards the periphery of the diffuser panel 72 from the axis line X. In other words, as illustrated in FIGS. 4 to 6, a back surface 72a of the diffuser panel 72 at the back side in the depth direction is formed in a convex shape curving and protruding towards the illuminating light dividing and outputting portion 60 with a portion at which the optical axis (axis line X) of the light received from the illuminating light dividing and outputting portion 60 crosses being the peak. In other words, the back surface 72a of the diffuser panel 72 is formed in a convex shape with the cross point with the axis line X being most protruding towards the back side in the depth direction. In the present embodiment, the diffuser panel 72 is disposed such that the axis line X crosses the substantial center (or the center of gravity) of the back surface 72a. Thus, the back surface 72a of the diffuser panel 72 bulges at the center and the periphery of the center of the back surface 72a.

Although, in the present embodiment, as illustrated in FIG. 3, the opposite surface of the back surface 72a, that is, the main surface 72b of the diffuser panel 72 at the front side thereof in the depth direction is formed in a concave shape curving along the convex shape of the back surface 72a, the main surface 72b may be a flat surface instead of a concave surface.

In the present embodiment, in particular, a reflector 77 (first reflector) that reflects light output from the illuminating light dividing and outputting portion 60 towards the illuminating light dividing and outputting portion 60 (towards the back side of the diffuser panel 72 in the depth direction) is provided on the peak of the convex shape of the back surface 72a of the diffuser panel 72. The reflector 77 can be integrally formed with the diffuser panel 72 by way of, for example, two color molding. The reflector 77 is provided in a region including the cross point with the optical axis (axis line X) of the light received from the illuminating light dividing and outputting portion 60. In the present embodiment, as illustrated in FIGS. 5 and 6, the reflector 77 covers a region from the peak of the convex shape to a position a certain length away from the peak in the depth direction. In other words, the surface of the reflector 77 is a curved surface having a convex shape protruding towards the back side of the diffuser panel 72 in the depth direction, and is disposed opposite to the curved surface 75 on the bottom wall 73b of the LCD case 73.

The curved surface 75 on the bottom wall 73b of the LCD case 73 faces the back surface 72a of the diffuser panel 72, and is formed in a concave shape curving relative to the diffuser panel 72. With this configuration, the curved surface 75 can reflect the light reflected on the reflector 77 to the diffuser panel 72, and the diffuser panel 72 can receive the light again. In other words, the reflector 77 of the diffuser panel 72 functions as a first reflector that reflects light output from the illuminating light dividing and outputting portion 60, and the curved surface 75 on the bottom wall 73b of the LCD case 73 functions as a second reflector that reflects light reflected on the reflector 77 to the diffuser panel 72.

Described next is how the liquid crystal display device 70 and the vehicle measuring instrument 1 according to the present embodiment function with reference to FIG. 7. FIG. 7 is an enlarged view of the main portion in FIG. 2 illustrating an outline of light guiding process of illuminating light emitted from the light source in the vehicle measuring instrument and the liquid crystal display device according to the present embodiment.

As illustrated in FIG. 7, light L1 and L2 emitted from the indicating needle illuminating light source 50 are introduced into the indicating needle drive shaft 41 of the indicating needle driving unit 40, and is guided along the direction of the axis line X to the front side of the indicating needle drive shaft 41 and are introduced into the shaft connecting portion 31 of the indicating needle member 30. The light L2 of the light L1 and L2 introduced into the shaft connecting portion 31 is introduced into the indicating needle 32 along an inclined surface 31a of the shaft connecting portion 31. The indicating needle 32 of the indicating needle member 30 is illuminated by the light L2.

The light L1 of the light L1 and L2 introduced into the shaft connecting portion 31 is introduced to the illuminating light dividing and outputting portion 60 from the shaft connecting portion 31. The light L1 introduced into the illuminating light dividing and outputting portion 60 is guided to the liquid crystal display device 70 through the through hole 76 of the LCD case 73, and is output from the front end surface 61 of the illuminating light dividing and outputting portion 60 right in front of the reflector 77 on the back surface 72a of the diffuser panel 72 to the front side. The light L1 output from the illuminating light dividing and outputting portion 60 is diffused because the front end surface 61 is formed in a shape of a concave lens, and illuminates a broad range of the back surface 72a of the diffuser panel 72.

Light, out of the light L1 output from the illuminating light dividing and outputting portion 60, output to a region of the reflector 77 on the back surface 72a of the diffuser panel 72 is reflected on the reflector 77, and the optical axis of the light is changed, so that the reflected light travels towards the back side of the diffuser panel 72 and travels towards an outer side in the radial direction from the axis line X (towards the periphery of the diffuser panel 72). The light reflected on the reflector 77 is then reflected on the curved surface 75 on the bottom wall 73b of the LCD case 73, and the optical axis is changed again, thereby reaching the periphery of the diffuser panel 72. A part of the reflected light is again reflected on the back surface 72a of the diffuser panel 72 and then on the curved surface 75 of the bottom wall 73b, thereby reaching the peripheral areas of the diffuser panel 72.

As described above, the light L1 output from the illuminating light dividing and outputting portion 60 with the axis line X being the optical axis is reflected on the reflector 77 of the diffuser panel 72 and then on the curved surface 75 of the LCD case 73, and the light L1 spreads towards peripheral areas and enters from all over the diffuser panel 72. The light that has entered into the diffuser panel 72 is diffused by the function of the diffuser panel 72, and is distributed to the entire area of the back surface of the liquid crystal panel 71. With this configuration, the liquid crystal panel 71 can receive light having uniform luminance.

Described next are effects of the liquid crystal display device 70 and the vehicle measuring instrument 1 according to the present embodiment.

The liquid crystal display device 70 according to the present embodiment includes the liquid crystal panel 71; the indicating needle illuminating light source 50 as a light source; the illuminating light dividing and outputting portion 60 that guides light emitted from the indicating needle illuminating light source 50 to the back surface of the liquid crystal panel 71; the diffuser panel 72 that is disposed between the illuminating light dividing and outputting portion 60 and the liquid crystal panel 71, extends over the entire area of the back surface of the liquid crystal panel 71, and diffuses the light received from the illuminating light dividing and outputting portion 60 to illuminate the light to the liquid crystal panel 71; the reflector 77 that is provided, on the back surface 72a of the diffuser panel 72 close to the illuminating light dividing and outputting portion 60, on the optical axis X of light received from the illuminating light dividing and outputting portion 60, and reflects the light towards the illuminating light dividing and outputting portion 60; and the curved surface 75 of the LCD case 73 that reflects light reflected on the reflector 77 to the diffuser panel 72.

With this configuration, light, out of the light output from the illuminating light dividing and outputting portion 60, on and around the optical axis X having intense luminance is reflected on the reflector 77, thereby suppressing light having intense luminance from directly entering into the diffuser panel 72. The light output from the illuminating light dividing and outputting portion 60 is reflected on the reflector 77 of the diffuser panel 72 and on the curved surface 75 of the LCD case 73, and the light spreads all over the diffuser panel 72 and enters into the diffuser panel 72 not only from a range that the illuminating light dividing and outputting portion 60 directly irradiates but from the entire area of the diffuser panel 72. Thus, the difference in an irradiation quantity of light can be reduced between a region directly irradiated by the illuminating light dividing and outputting portion 60 and the peripheral region. The diffuser panel 72 is accommodated in the LCD case 73 with the back surface 72a including the reflector 77 facing the curved surface 75 on the inner surface of the bottom wall 73b of the LCD case 73. With this configuration, nothing prevents the reflected light from travelling between the reflector 77 and the curved surface 75, whereby light output from the illuminating light dividing and outputting portion 60 can efficiently be spread towards the peripheral areas of the diffuser panel 72. Consequently, the liquid crystal display device 70 according to the present embodiment can obtain uniform luminance of light output from the diffuser panel 72 to the liquid crystal panel 71, thereby improving the uniformity of luminance of the liquid crystal display device 70.

The liquid crystal display device 70 according to the present embodiment also includes the plate springs 74 disposed on the periphery of the main surface 72b of the diffuser panel 72 close to the liquid crystal panel 71 and functioning as a spacer for maintaining a certain distance between the diffuser panel 72 and the liquid crystal panel 71.

This configuration can hold the liquid crystal panel 71 and the diffuser panel 72 with a certain space left therebetween and can form an air layer between the liquid crystal panel 71 and the diffuser panel 72, thereby improving the diffusibility of light.

The diffuser panel 72 and the reflector 77 of the liquid crystal display device 70 according to the present embodiment are integrally formed by way of, for example, two color molding. With this configuration, the liquid crystal display device 70 can be more easily assembled because positions of the reflector 77, the diffuser panel 72, and the curved surface 75 are easily determined by mounting the diffuser panel 72 on the LCD case 73. This configuration can reduce the number of components required for the liquid crystal display device 70.

The illuminating light dividing and outputting portion 60 of the liquid crystal display device 70 according to the present embodiment is configured to output light received from the indicating needle illuminating light source 50 to the center of the back surface of the liquid crystal panel 71 in the direction of the optical axis X perpendicular to the back surface of the liquid crystal panel 71. The back surface 72a of the diffuser panel 72 is formed in a convex shape curving and protruding towards the illuminating light dividing and outputting portion 60 with a point at which the optical axis X of light received from the illuminating light dividing and outputting portion 60 crosses being the peak. The reflector 77 is provided on the peak portion of the convex shape on the back surface 72a of the diffuser panel 72. The curved surface 75 of the LCD case 73 faces the back surface 72a of the diffuser panel 72 and is formed in a concave shape curving relative to the diffuser panel 72.

With this configuration, the diffuser panel 72 is thickest at a region irradiated by the illuminating light dividing and outputting portion 60, and has a shape with which light is well diffused, whereby the difference in luminance can be reduced between light output from the center of the diffuser panel 72 and light output from the periphery thereof to the liquid crystal panel 71. The reflector 77 is a curved surface having a convex shape and can reflect light output from the illuminating light dividing and outputting portion 60 towards peripheral areas, whereby light can efficiently be spread before entering into the diffuser panel 72.

The vehicle measuring instrument 1 according to the present embodiment includes the liquid crystal display device 70 described above; the dial plate 20 that has the indicating needle drive shaft inserting hole 21 and on which the scale and characters 22 corresponding to a measured quantity are arranged in a substantial circular-arc shape with the indicating needle drive shaft inserting hole 21 being the center; the indicating needle driving unit 40 that includes the indicating needle drive shaft 41 composed of a light guide material formed in a shape of a shaft and inserted into the dial plate 20 from the back side to the front side thereof through the indicating needle drive shaft inserting hole 21, that is disposed at the back side of the dial plate 20, and that rotationally drives the indicating needle drive shaft 41; the indicating needle member 30 that includes the shaft connecting portion 31 fixed on the front end of the indicating needle drive shaft 41 and includes the indicating needle 32 extending in the radial direction of the dial plate 20 from the shaft connecting portion 31 and indicating the scale 22, and that is composed of a light guide material; and the indicating needle illuminating light source 50 disposed opposite to the back end of the indicating needle drive shaft 41 and illuminating the indicating needle member 30 via the indicating needle drive shaft 41 that introduces illuminating light to the indicating needle member 30. The light source for the liquid crystal display device 70 is the indicating needle illuminating light source 50. The illuminating light dividing and outputting portion 60 of the liquid crystal display device 70 is provided to protrude from the shaft connecting portion 31 towards the liquid crystal display device 70, and outputs, to the liquid crystal display device 70, a part of the illuminating light received from the indicating needle drive shaft 41.

With this configuration, the liquid crystal display device 70 installed in the vehicle measuring instrument 1 can be illuminated by uniform and stable light without adding a dedicated light source because the indicating needle illuminating light source 50 is also used as the light source for the liquid crystal display device 70. Moreover, because the vehicle measuring instrument 1 does not include an additional light source, it can avoid a complex structure and increase in manufacturing cost.

While a certain embodiment has been described, the embodiment has been presented by way of example only, and is not intended to limit the scope of the invention. Indeed, the novel embodiment described herein may be embodied in a variety of other forms; furthermore, various omissions, substitutions, and changes in the form of the embodiment described herein may be made without departing from the spirit of the invention. Such forms or modifications are covered by the accompanying claims and their equivalents as would fall within the scope and spirit of the invention.

Although, in the above embodiment, the illuminating light dividing and outputting portion 60 is disposed on the extension of the indicating needle drive shaft 41 that introduces light from the indicating needle illuminating light source 50 to the indicating needle member 30, the illuminating light dividing and outputting portion 60 may be disposed in a position not on the extension of the indicating needle drive shaft 41. For example, the liquid crystal display device 70 may be disposed in a position not in the center of the dial plate 20, and the illuminating light dividing and outputting portion 60 may be disposed such that it extends in the width direction to connect a position of the indicating needle illuminating light source 50 with a position of the liquid crystal display device 70.

The form of the reflector 77 on the back surface 72a of the diffuser panel 72 and the form of the curved surface 75 of the LCD case 73 are not limited to those described in the embodiment, but may be any form as long as the reflector 77 and the curved surface 75 can reflect light therebetween so that light received at the center portion can spread towards the peripheral areas.

The liquid crystal display device 70 according to the above embodiment may be installed in other devices than the vehicle measuring instrument 1 described above, or may be an individual device by itself. Although, in the above embodiment, the indicating needle illuminating light source 50 and the illuminating light dividing and outputting portion 60 of the vehicle measuring instrument 1 are used as the light source and the light guide member of the liquid crystal display device 70, a dedicated light source and a dedicated light guide member different from the indicating needle illuminating light source 50 and the illuminating light dividing and outputting portion 60 may be provided for the liquid crystal display device 70.

The word "reflect" used in the above embodiment indicates mirror reflection and diffused reflection that occur on a surface of an object when light enters into the object, and also indicates internal reflection in which light entered into an object is reflected by particle diffuse matter in the object and is returned to where the light has entered. Although, in the above embodiment, the reflector 77 is integrally formed with the diffuser panel 72 by way of, for example, two color molding, and the surface of the reflector 77 is formed into a curved surface having a convex shape continuously connecting to the surface of the diffuser panel 72, the form of the reflector 77 is not limited to this. For example, the reflector 77 may be separated from the diffuser panel 72 and formed into, for example, a cylindrical shape, and may be disposed such that the reflector 77 protrudes from the back surface 72a of the diffuser panel 72. The reflector 77 may simply be disposed, on the back surface 72a of the diffuser panel 72, on the optical axis X of light received from the illuminating light dividing and outputting portion 60.

According to the present invention, light emitted from the light source is output from the light guide member to the diffuser panel, and the light is reflected on the first reflector and then on the second reflector, whereby the light can efficiently be dispersed to the peripheral areas of the diffuser panel and the diffuser panel can output light with uniform luminance to the liquid crystal panel. Thus, the liquid crystal display device can improve uniformity of luminance.

What is claimed is:

1. A liquid crystal display device comprising:
   a liquid crystal panel;
   a light source;
   a light guide member configured to guide light emitted from the light source to a back surface side of the liquid crystal panel;
   a diffuser panel configured to be disposed between the light guide member and the liquid crystal panel, extend over an entire area of the back surface of the liquid crystal panel, and diffuse the light received from the light guide member to illuminate the light to the liquid crystal panel;
   a first reflector configured to be provided on a back surface of the diffuser panel close to the light guide member side and on an optical axis of the light received from the light guide member, and reflect the light towards the light guide member side;
   a second reflector configured to reflect the light reflected on the first reflector to the diffuser panel side; and
   a spacer configured to be provided on a periphery of a surface of the diffuser panel close to the liquid crystal panel side, and maintain a certain distance between the diffuser panel and the liquid crystal panel.

2. The liquid crystal display device according to claim 1, wherein
   the diffuser panel and the first reflector are integrally formed.

3. The liquid crystal display device according to claim 2, wherein
   the light guide member is configured to output the light from the light source to a center portion of the back surface of the liquid crystal panel in a direction in which the optical axis orthogonally crosses the back surface,
   the back surface of the diffuser panel is formed in a convex shape curving and protruding towards the light guide member side with a point at which the optical axis of the light received from the light guide member crosses the back surface of the diffuser panel being a peak portion,
the first reflector is provided on the peak portion of the convex shape, and
the second reflector faces the back surface of the diffuser panel and is formed in a concave shape curving relative to the diffuser panel.

4. A vehicle measuring instrument comprising:
the liquid crystal display device according to claim 2;
a dial plate configured to include a indicating needle drive shaft inserting bole, and arrange thereon a scale and characters corresponding to a measured quantity in a substantial circular-arc shape with the indicating needle drive shaft inserting hole being a center;
an indicating needle driving unit configured to include an indicating needle drive shaft composed of a light guide material formed in a shape of a shaft and inserted into the dial plate from a back surface side to a front surface side of the dial plate through the indicating needle drive shaft inserting hole, and rotationally drive the indicating needle drive shaft by being disposed at the back surface side of the dial plate;
an indicating needle member composed of a light guide material and configured to include a shaft connecting portion fixed on a leading end of the front surface side of the indicating needle drive shaft, and an indicating needle extending in a radial direction of the dial plate from the shaft connecting portion to indicate the scale; and
an indicating needle illuminating light source configured to be disposed opposite to a leading end of the back surface side of the indicating needle drive shaft, and illuminate the indicating needle member by introducing illuminating light to the indicating needle drive shaft, wherein
the liquid crystal display device is disposed at the front surface side of the dial plate so as to cover the shaft connecting portion,
the light source for the liquid crystal display device is the indicating needle illuminating light source, and
the light glide member of the liquid crystal display device is provided to protrude from the shaft connecting portion towards the liquid crystal display device side and is configured to output a part of the illuminating light received from the indicating needle drive shaft to the liquid crystal display device side.

5. The liquid crystal display device according to claim 1, wherein
the light guide member is configured to output the light from the light source to a center portion of the back surface of the liquid crystal panel in a direction in which the optical axis orthogonally crosses the back surface,
the back surface of the diffuser panel is formed in a convex shape curving and protruding towards the light guide member side with a point at which the optical axis of the light received from the light guide member crosses the back surface of the diffuser panel being a peak portion,
the first reflector is provided on the peak portion of the convex shape, and
the second reflector faces the back surface of the diffuser panel and is formed in a concave shape curving relative to the diffuser panel.

6. A vehicle measuring instrument comprising:
the liquid crystal display device according to claim 5;
a dial plate configured to include a indicating needle drive shaft inserting hole, and arrange thereon a scale and characters corresponding to a measured quantity in a substantial circular-arc shape with the indicating needle drive shaft inserting hole being a center;
an indicating needle driving unit configured to include an indicating needle drive shaft composed of a light guide material formed in a shape of a shaft and inserted into the dial plate from a back surface side to a front surface side of the dial plate through the indicating needle drive shaft inserting hole, and rotationally drive the indicating needle drive shaft by being disposed at the back surface side of the dial plate;
an indicating needle member composed of a light guide material and configured to include a shaft connecting portion fixed on a leading end of the front surface side of the indicating needle drive shaft, and an indicating needle extending in a radial direction of the dial plate from the shaft connecting portion to indicate the scale; and
an indicating needle illuminating light source configured to be disposed opposite to a leading end of the back surface side of the indicating needle drive shaft, and illuminate the indicating needle member by introducing illuminating light to the indicating needle drive shaft, wherein
the liquid crystal display device is disposed at the front surface side of the dial plate so as to cover the shaft connecting portion,
the light source for the liquid crystal display device is the indicating needle illuminating light source, and
the light guide member of the liquid crystal display device is provided to protrude from the shaft connecting portion towards the liquid crystal display device side and is configured to output a part of the light received from the indicating needle drive shaft to the liquid crystal display device side.

7. A vehicle measuring installment comprising:
the liquid crystal display device, according to claim 1;
a dial plate configured to include a indicating needle drive shaft inserting hole, and arrange thereon a scale and characters corresponding to a measured quantity in a substantial circular-arc shape with the indicating needle drive shaft hole being a center;
an indicating needle driving unit configured to include an indicating needle drive shaft composed of a light guide material formed in a shape of a shaft and inserted into the dial plate from a back surface side to a front surface side of the dial plate through the indicating needle drive shaft inserting hole, and rotationally drive the indicating needle drive shaft by being disposed at the back surface side of the dial plate;
an indicating needle member composed of a light guide material and configured to include a shaft connecting portion fixed on a leading end of the front surface side of the indicating needle drive shaft, and an indicating needle extending in a radial direction of the dial plate from the shaft connecting portion to indicate the scale; and
an indicating needle illuminating light source configured to be disposed opposite to a leading end of the back surface side of the indicating needle drive shaft, and illuminate the indicating needle member by introducing illuminating light to the indicating needle drive shaft, wherein the liquid crystal display device is disposed at the front surface side of the dial plate so as to cover the shaft connecting portion, the light source for the liquid crystal display device is the indicating needle illuminating light source, and the light guide member of the liquid crystal display device is provided to protrude from the shaft correcting portion towards the liquid crystal display device side and is configured to output a part of the illuminating light received from the indicating needle drive shaft to the liquid crystal display device side.

8. A liquid crystal display device comprising:
a liquid crystal panel;
a light source;
a light guide member extending along an axis line, the light guide member being configured to guide light emitted from the light source to a back surface side of the liquid crystal panel that is provided above an indicating needle;
a diffuser panel configured to be disposed between the light guide member and the liquid crystal panel along the axis line, extend over an entire area of the back surface of the liquid crystal panel, and diffuse the light received from the light guide member to illuminate the light to the liquid crystal panel;
a first reflector configured to be provided on a back surface of the diffuser panel between the light guide member and the diffuser panel along the axis line and on an optical axis of the light received from the light guide member, and reflect the light towards the light guide member side; and
a second reflector configured to reflect the light reflected on the first reflector to the diffuser panel side, wherein
the light guide member is configured to output the light from the light source to a center portion of the back surface of the liquid crystal panel in a direction in which the optical axis orthogonally crosses the back surface,
the back surface of the diffuser panel is formed in a convex shape curving and protruding towards the light guide member side with a point at which the optical axis of the light received from the light guide member crosses the back surface of the diffuser panel being a peak portion,
the first reflector is provided on the peak portion of the convex shape, and
the second reflector faces the back surface of the diffuser panel and is formed in a concave shape curving relative to the diffuser panel.

9. A vehicle measuring instrument comprising:
a liquid crystal display device comprising:
    a liquid crystal panel,
    a light source,
    a light guide member extending along an axis line, the light guide member being configured to guide light emitted from the light source to a back surface side of the liquid crystal panel that is provided above an indication needle,
    a diffuser panel configured to be disposed between the light guide member and the liquid crystal panel along the axis line, extend over an entire area of the back surface of the liquid crystal panel, and diffuse the light received from the light guide member to illuminate the light to the liquid crystal panel,
    a first reflector configured to be provided on a back surface of the diffuser panel between the light guide member and the diffuser panel along the axis line and on an optical axis of the light received from the light guide member, and reflect the light towards the light guide member side, and
    a second reflector configured to reflect the light reflected on the first reflector to the diffuser panel side;
a dial plate configured to include a indicating needle drive shaft inserting hole, and arrange thereon a scale and characters corresponding to a measured quantity in a substantial circular-arc shape with the indicating needle drive shaft inserting hole being a center;
an indicating needle driving unit configured to include an indicating needle drive shaft composed of a light guide material formed in a shape of a shaft and inserted into the dial plate from a back surface side to a front surface side of the dial plate through the indicating needle drive shaft inserting hole, and rotationally drive the indicating needle drive shaft by being disposed at the back surface side of the dial plate;
an indicating needle member composed of a light guide material and configured to include a shaft connecting portion fixed on a leading end of the front surface side of the indicating needle drive shaft, and the indicating needle extending in a radial direction of the dial plate from the shaft connecting portion to indicate the scale; and
an indicating needle illuminating light source configured to be disposed opposite to a leading end of the back surface side of the indicating needle drive shaft, and illuminate the indicating needle member by introducing illuminating light to the indicating needle drive shaft, wherein the liquid crystal display device is disposed at the front surface side of the dial plate so as to cover the shaft connecting portion, the light source for the liquid crystal display device is the indicating needle illuminating light source, and the light guide member of the liquid crystal display device is provided to protrude from the shaft connecting portion towards the liquid crystal display device side and is configured to output a part of the illuminating light received from the indicating needle drive shaft to the liquid crystal display device side.

* * * * *